United States Patent
Clark et al.

(10) Patent No.: US 7,090,370 B2
(45) Date of Patent: Aug. 15, 2006

(54) EXTERIOR LUMINAIRE

(75) Inventors: Kevin Clark, Birmingham (GB); Carl Clarke, Coventry (GB)

(73) Assignee: Advanced Leds Limited (GB)

( * ) Notice: Subject to any disclaimer, the term of this patent is extended or adjusted under 35 U.S.C. 154(b) by 0 days.

(21) Appl. No.: 10/479,544

(22) PCT Filed: Jun. 10, 2002

(86) PCT No.: PCT/GB02/02651

§ 371 (c)(1),
(2), (4) Date: May 14, 2004

(87) PCT Pub. No.: WO02/101285

PCT Pub. Date: Dec. 19, 2002

(65) Prior Publication Data

US 2004/0196653 A1    Oct. 7, 2004

(30) Foreign Application Priority Data

Jun. 8, 2001 (EP) .................................. 0113979
Jun. 8, 2001 (GB) ................................ 0113977.3

(51) Int. Cl.
*F21L 4/00* (2006.01)

(52) U.S. Cl. ..................... 362/183; 362/227; 362/800

(58) Field of Classification Search ................ 362/183, 362/266, 415
See application file for complete search history.

(56) References Cited

U.S. PATENT DOCUMENTS

| 3,254,324 | A | * | 5/1966 | Casciato et al. ............ 340/909 |
| 4,343,032 | A | * | 8/1982 | Schwartz ..................... 362/276 |
| 4,358,816 | A | | 11/1982 | Soileau |
| 4,701,832 | A | | 10/1987 | Lasker |
| 5,224,773 | A | * | 7/1993 | Arimura ..................... 362/227 |
| 5,237,490 | A | * | 8/1993 | Ferng ......................... 362/183 |
| 5,453,729 | A | * | 9/1995 | Chu .......................... 340/332 |
| 5,561,346 | A | | 10/1996 | Byrne |
| 5,630,660 | A | * | 5/1997 | Chen ......................... 362/183 |
| 5,664,874 | A | * | 9/1997 | Winterer ..................... 362/191 |
| 5,836,676 | A | | 11/1998 | Ando et al. |
| 5,984,570 | A | * | 11/1999 | Parashar ...................... 404/14 |
| 6,263,601 | B1 | * | 7/2001 | Emert ......................... 40/564 |
| 6,299,325 | B1 | * | 10/2001 | Cathel ........................ 362/183 |
| 6,402,338 | B1 | * | 6/2002 | Mitzel et al. ............... 362/154 |
| 6,517,217 | B1 | * | 2/2003 | Liao .......................... 362/235 |
| 6,530,679 | B1 | * | 3/2003 | Nishioka ..................... 362/339 |
| 2002/0176248 | A1 | | 11/2002 | Wismeth et al. |

FOREIGN PATENT DOCUMENTS

WO    WO0136866    5/2001

* cited by examiner

*Primary Examiner*—Ali Alavi
*Assistant Examiner*—Hargobind S. Sawhney
(74) *Attorney, Agent, or Firm*—Ira S. Dorman

(57) ABSTRACT

An exterior luminaire comprising an array of light emitting diodes (2) within an outer body (12). Also within the outer body (12) is housed apparatus (7) for collecting and converting radiation into electrical energy so as to provide at least a part of the power required by the light emitting diodes (2), at least one light reflecting member (22) for reflecting light emitted by the light emitting diodes (2) out of the outer body (12), a light diffusing member (16) in the path of the reflected light, and means for maintaining the temperature around the array of light emitting diodes (2) within a predetermined range.

30 Claims, 3 Drawing Sheets

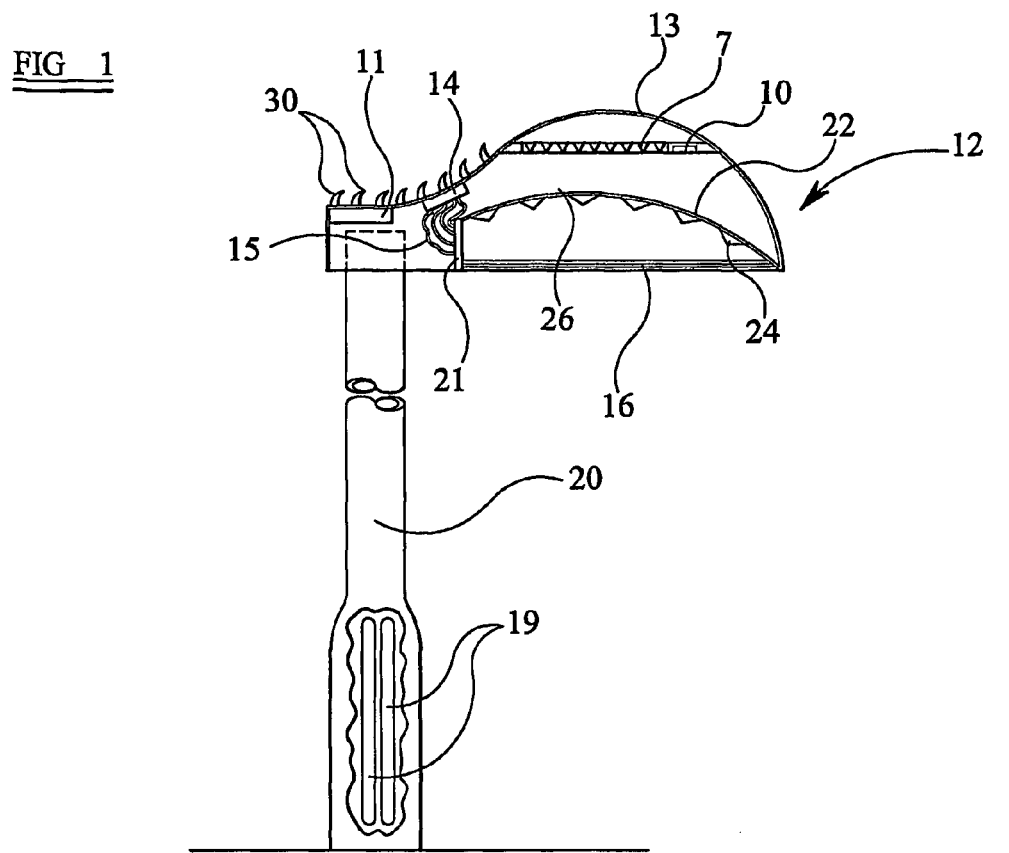
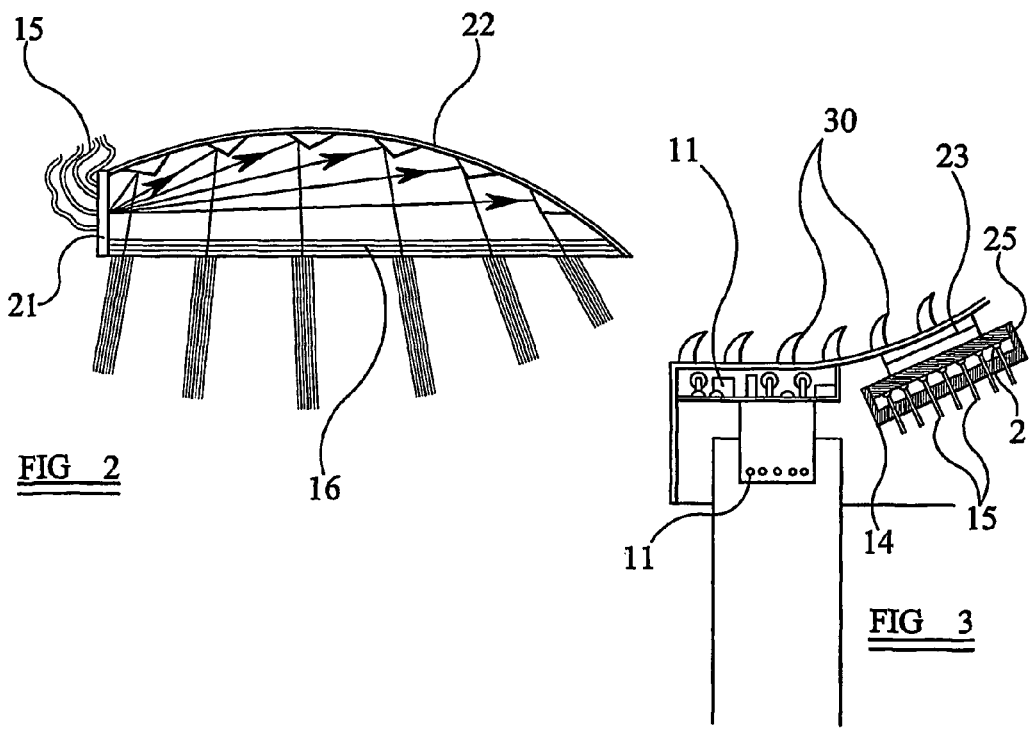

EXTERIOR LUMINAIRE

The present invention relates to an exterior luminaire, for example a luminaire suitable for use to illuminate pathways, roads, public and amenity areas and buildings.

Standard column top luminaires use a discharge lamp and control apparatus, which produces light distribution in a very general and uncontrolled manner.

Standard lighting means, which use light emitting diodes (LEDs) as the light source, emit to the surroundings a light which glares, that is the light is strong and dazzling. The glare is due to the presence of one or more concentrating lenses in front of the LED array. The creation of dazzling light restricts the use of LED lighting for certain applications, for example to illuminate roads, traffic islands and crossings.

Lighting in general is not energy efficient as the heat generated by the lighting means is often lost to the surroundings by mean's of non-visible radiation.

It is the object of the invention to provide an exterior luminaire which is energy efficient and emits light with reduced glare.

According to the present invention there is provided an exterior luminaire comprising within an outer body an array of light emitting diodes and apparatus for collecting and converting radiation into electrical energy so as to provide at least a part of the power required by the light emitting diodes, wherein within the outer body is housed at least one light reflecting member for reflecting light emitted by the light emitting diodes out of the outer body, and a light diffusing member in the path of the reflected light, the array of light emitting diodes being contained within a temperature controlled chamber to maintain the temperature around the array of light emitting diodes within a predetermined range.

The converted electrical energy may be stored in at least one chargeable battery which may be remote from the outer body. Electronic circuitry may be provided for controlling the charging rate of the at least one battery.

The light collecting apparatus may comprise at least one solar panel. The at least one solar panel may be shaped and the shape may be selected from a pyramid, a diamond, a polyhedron and a hemi-sphere. The at least one solar panel may be shaped such that an upper surface of the at least one solar panel is substantially parallel with a lower surface thereof.

The at least one solar panel may be positioned in an upper region of the outer body.

The at least one reflecting member may have a surface comprising a number of facets or a number of finishes to reflect the light along different angles.

The temperature controlled chamber may be thermally sealed.

The array of light emitting diodes may comprise diodes arranged at different angles relative to the at least one reflecting member.

The light emitted by the array of light emitting diodes may be transmitted directly to the at least one reflecting member or may be transmitted by fibre optic means to a means of distribution before being directed at the at least one reflecting member.

The light emitting diodes may be selected to produce a plurality of chromatic wavelengths which may be mixed to generate different colours and/or colour temperatures.

Electronic circuitry may be provided for controlling the chromatic wavelength of light emitted from the luminaire.

The heat regulating means may comprise a heat sink, a thermal chamber, a heat pump and a conversion device.

The heat regulating means may convert heat energy into electrical energy for storage and subsequent use. The electrical energy may be stored in at least one battery, which may be remote from the outer body.

The outer body may also house at least one photo-sensitive cell which may provide information to electronic controlling circuitry. The information may be used by the electronic controlling circuitry for the activating and deactivating of the light emitting diodes during the cycle of day and night, and/or to regulate the charging and discharging rates of the at least one battery.

The outer body may also house at least one light sensor which may provide feedback information to electronic controlling circuitry. The feedback information may be used by the electronic controlling circuitry to adjust power supplied to the light emitting diodes to achieve an electrical characteristic produced by the light sensor that matches pre-set characteristics known to give required lighting effects.

The light diffusing material may comprise an internally patterned polycarbonate material.

Electronic circuitry may be provided to transmit data relating to the operational status of the exterior luminaire to a computer for analysis and display.

For a better understanding of the present invention and to show more clearly how it may be carried into effect reference will now be made, by way of example, to the accompanying drawings in which:

FIG. 1 is a first embodiment of an exterior luminaire according to the present invention supported on a standard street lighting column;

FIG. 2 is a view, on a larger scale, of a reflector component of the exterior luminaire shown in FIG. 1, showing schematically the various pathways of light reflected by facets on the surface of the reflector;

FIG. 3 is a view, on a larger scale, of the arrangement of the LED and heat regulating components of the exterior luminaire shown in FIG. 1;

Figure 4:
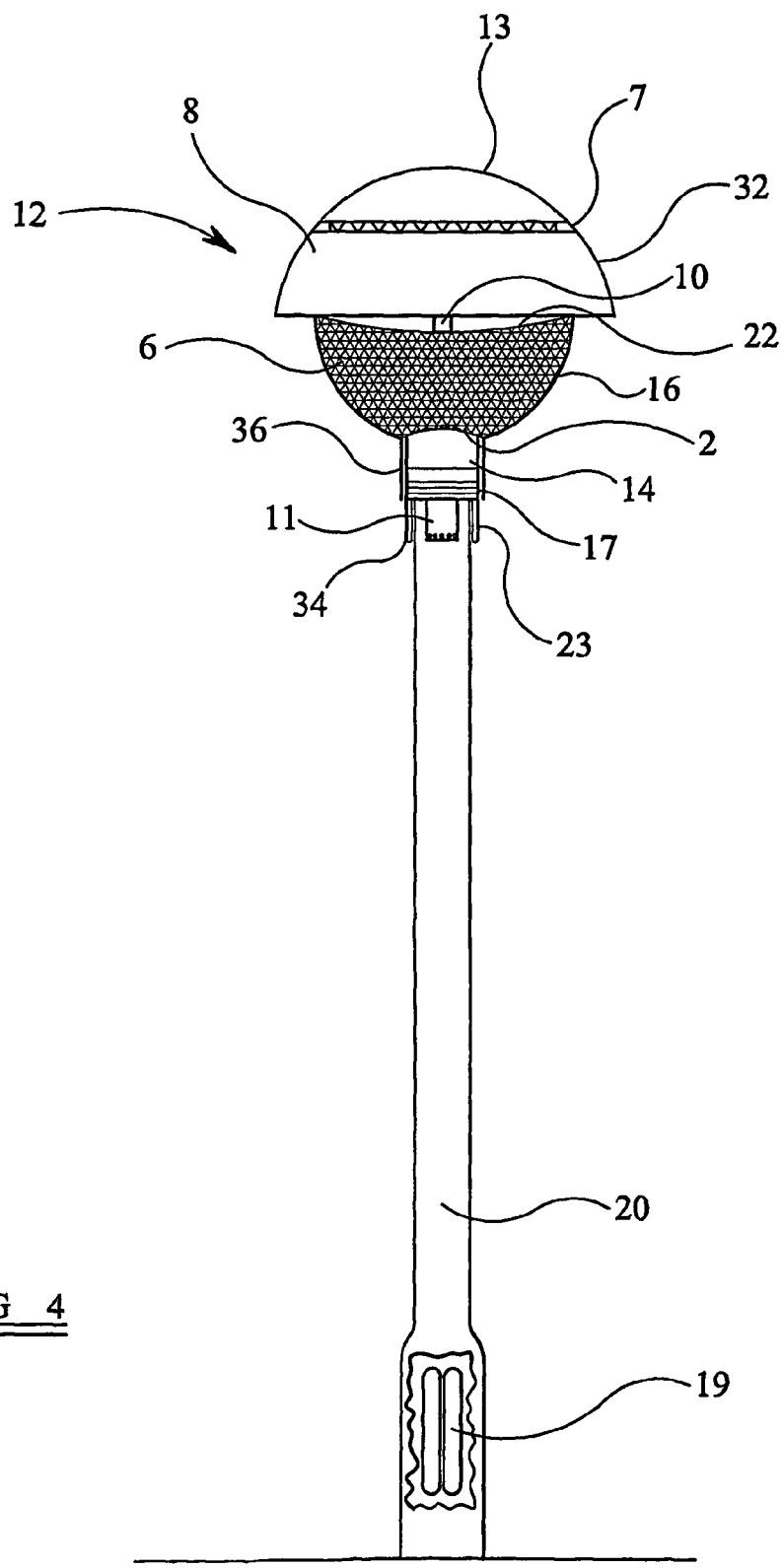
FIG. 4 is a second embodiment of an exterior luminaire according to the present invention supported on a standard street lighting column.

FIGS. 1 to 3 show a first embodiment of an exterior luminaire attached to a standard street lighting support 20. The exterior luminaire comprises an outer body 12 which has a substantially hemi-spherical cross section with a rectangular extension at the region of the outer body where the luminaire is attached to the support 20.

Within the outer body is situated a thermally insulated and sealed chamber 14 containing an array of high output light emitting diodes (LEDs), the chamber 14 being connected to a distribution means 21 of a reflector 22 by means of fibre optic tails 15.

Also housed in the outer body 12 is a solar panel 7 beneath a region 13 of the outer body 12 shaped to capture low angled incident light and manufactured from a light gathering material. The light gathering region 13 has a series of flats and lenses in its outer profile which capture rays of sunlight and direct the light onto the surface of the solar panel. The presence of the lenses and flats results in there being no need for the solar panel to be angled to capture the maximum light available. The lenses of the light gathering region 13 are made up of a series of layers with different refractive indices which act as a one way reflecting surface to retain the light within the upper region 13 and transmit the maximum amount light to the solar panel 7.

A light diffusing material 16 is present in the lower region of the outer body 12. Also within the outer body 12 is a photo-sensitive cell 10 and electronic circuitry 11.

The standard street lighting column support 20 is shown in cut away to reveal the position of remote batteries 19. The batteries 19 are situated in the base of the standard support 20 for ease of maintenance.

The solar panel 7 collects light energy entering the light gathering region 13 of the outer body 12 and converts it to electrical energy. The electrical energy is stored in the batteries 19 which supply at least a part of the power required by the array of light emitting diodes in the chamber 14. Additional electrical energy for storage and use is recovered by means of heat regulating means which collects heat released by the LED array and converts a proportion of the heat into electrical energy. This electrical energy is stored in the batteries 19. If the batteries 19 do not have sufficient charge to power the LED array, additional power means (not shown), for example mains electricity, may be used.

The LED chamber 14 is dust tight and thermally sealed such that it is protected against ingress of water and moisture even under heavy jet spray conditions, for example it complies with the industrial standard IP66. The chamber is also temperature controlled by means of the heat regulating means 23 which removes excess heat from within the chamber 14, and by high efficiency insulating material which restricts heat ingress from outside the chamber.

The array of LEDs contained in the chamber 14 comprises a selection of diodes which emit light with either red, green or blue wavelengths. By means of the electronic circuitry 11 the light leaving the exterior luminaire can be controlled, for example by the customer, to be a constant single colour, for example amber, to change colour or to be white light. The colour temperature of the light output can also be adjusted to suit the individual installation by means of a pre-set potentiometer or selector switch, for example set at a warm white, white or a cool white setting, or by remote DMX protocol signalling. The colour temperature is adjusted by altering the relative percentage outputs of the appropriate colour producing LEDs.

The light emitted from the thermally sealed LED chamber 14 is collected, and transported by the fibre optic tails 15 to the distribution means 21 of the reflector 22. The fibre optic tails 15 are bonded directly into insulation packing material of the LED chamber and the ends of the tails have specific facets ground and polished thereon. The fibre optic tails 15 have a refractive index as close as possible to that of the LEDs, thus allowing maximum light extraction.

The light emitted from the distribution means 21 is directed at the surface of the reflector 22 where it is reflected through the diffusing means 16 to the exterior of the outer body and towards the surrounding area to be illuminated. The surface of the reflector is arranged to be composed of a number of faceted reflecting members 24 which redirect the high intensity narrow angle light beam towards the exterior of the luminaire. The direct beam of light emitted from the distribution means 21 is reflected over a range of angles to create a wider beam of light for emission from the luminaire, as shown in FIG. 2.

The reflected light from the luminaire travels through the diffusing material 16, for example an internally patterned polycarbonate, which is configured to scatter the light into a random pattern such that it is emitted from the luminaire as lower intensity beams but with minimal change in the direction of the light beams. By passing the light through the diffusing material 16 prior to illuminating the surroundings, the glare of the light is reduced.

FIG. 3 shows the thermally insulated and sealed LED chamber 14 in which the LEDs are operated at a stable temperature. The fibre optic tails 15 are shown supported by an internal frame 25 before the tails pass through the insulation and the body of the chamber 14 towards the reflector.

LEDs operate at their optimum efficiency when used at low temperatures, for example between −40 and zero degrees Celsius. The working life of an LED increases if the working temperature is maintained as low as possible. The LEDs within the chamber 14 are mounted on a thermally conductive material which draws away heat generated by the LEDs and conducts the heat towards the heat conversion module 23. Heat in the LED chamber 14 is removed by the heat regulating means which comprises a heat pump (not shown), external heat dissipating fins 30, and the heat conversion module 23. The heat pump removes the heat and a proportion of the heat is converted into electrical energy by the conversion module 23. The conversion module 23 comprises a doped semi-conductor which produces electrical potential in response to the passage of heat through the semi-conductor material. The electrical potential produced by the doped semi-conductor is collected by a series of conductors within the material. The balance of heat is removed by convection through the external heat dissipating fins 30 on the exterior of the outer body 12. As hereinbefore described, the converted electrical energy is stored in the batteries 19.

A light sensor 26, situated adjacent to the reflector 22, generates an electrical current which is transmitted to the electronic circuitry 11 to determine whether there is any reduction in light output or change in colour temperature over time, for example due to the deterioration or failure of individual LEDs, and to compensate the power to the LEDs accordingly to maintain a stable light output over the life of the luminaire. The change in electrical current from the light sensor 26 triggers the electronic circuitry 11 to adjust the power to the appropriate red, green and blue LEDs to achieve an electrical characteristic produced by the light sensor that matches the pre-set characteristics known to give a required lighting effect.

The electronic circuitry 11 is responsible for the correct operation of the LEDs when the photo-sensitive cell 10 detects dusk. The circuitry 11 also monitors and regulates the re-use of electrical energy recovered from the heat conversion module 23 and controls the charging rate of the remote batteries 19 with energy from the solar panel 7 during daylight hours. The electronic circuitry, in conjunction with the photo-sensitive cell 10, also protects the batteries 19 against overcharging during periods of excessive light, for example during the summer months, and from being excessively discharged during prolonged poor light conditions, for example in the winter. Further, the electronic circuitry maintains a stable temperature in the LED chamber 14.

The electronic circuitry monitors and stores data on the operational status and characteristics of operating systems used in the luminaire, and transmits the data to a master or central computer (not shown) for analysis and display to an operator. The data storage is achieved by use of conventional electronics comprising slave and master units with the data being transmitted by mobile phone technology known to a person skilled in the art.

The circuitry can also be used to regulate a secondary set of equipment, for example traffic lights, warning signs, road signs and other street furniture, in the vicinity of the column supported luminaire.

FIG. 4 shows a second embodiment of an exterior luminaire attached to a standard street lighting support 20. The exterior luminaire comprises an outer body 12 which comprises three components, a lid assembly 8, a diffusing bowl 6 and a cylindrical chassis extension 34. The lid 8 and bowl 6 form a substantially spherical shape with a cylindrical chassis extension 34 on the lower surface of the luminaire where it is attached to the support 20.

The upper hemi-spherical lid component 8 contains a solar panel 7 positioned below and sealed to a light gathering region 13 of the outer body 12 to maintain a clean environment. The light gathering region comprises lenses for gathering sunlight and transmitting it to the solar panel as hereinbefore described. The lid component also houses a photo-sensitive cell 10.

The lower hemi-spherical diffusing bowl component 6 comprises an outer surface of light diffusing material 16 as hereinbefore described and contains a reflector 22 at the region where the first 8 and second 6 hemi-spherical components of the outer body 12 meet. Attached to the lower surface of the second component 6 of the outer body 12 is the cylindrical chassis 34.

Within the chassis 34 is situated a chamber 14 containing an array of high output light emitting diodes, electronic circuitry 11, and heat regulating means 17, 23, 36.

The standard street lighting support column 20 is shown in cut away to reveal the position of remote batteries 19.

As described hereinbefore in relation to the first embodiment, the solar panel 7 collects light energy entering the light gathering region 13 of the outer body 12 and converts it to electrical energy. The electrical energy is stored in the batteries 19 which supply at least a part of the power required by the array of light emitting diodes in the chamber 14. Additional electrical energy for storage and use is recovered by means of heat regulating means 17, 23, 36 which collects heat released by the LED array and converts it to electrical energy. This electrical energy is stored in the batteries 19. If the batteries 19 do not have sufficient charge to power the LED array, additional power means (not shown), for example mains electricity, may be used.

The LED chamber 14 is dust tight and thermally sealed such that it is protected against ingress of water and moisture even under heavy jet spray conditions, for example it complies with the industrial standard IP66. The chamber is also temperature controlled by means of the heat regulating means 23 which removes excess heat within the chamber 14, and by high efficiency insulating material which restricts heat ingress from outside the chamber.

The array of LEDs contained in the chamber 14 comprises a selection of diodes which emit light with either red, green or blue wavelengths. By means of the electronic circuitry 11 the light leaving the exterior luminaire can also be controlled to be a constant single colour, to change colour or to be white light.

The light emitted from the thermally sealed LED chamber 14 is directed at the surface of the reflector 22 where it is reflected through the diffusing means 16 to the exterior of the outer body and towards the surrounding area to be illuminated. The surface of the reflector is arranged to be composed of a number of faceted reflecting members 24 which redirect the high intensity narrow angle light beam towards the exterior of the luminaire.

Figure 5:
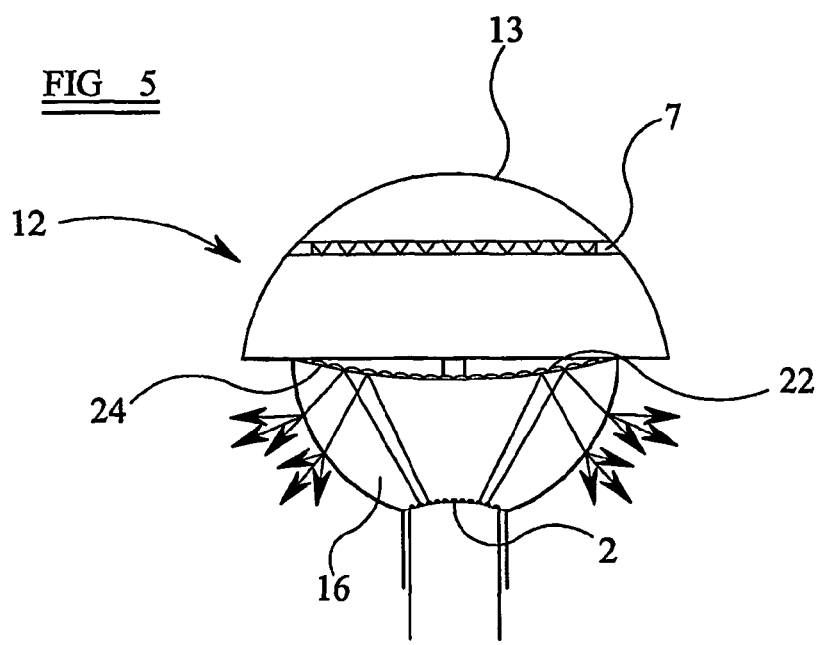
FIG. 5 is a schematic illustration of the various pathways of light reflected by facets on the surface of a reflector component of the exterior luminaire shown in FIG. 4.
Figure 6:
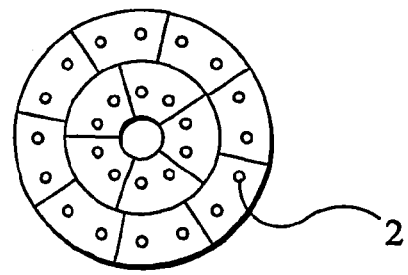
FIG. 6 is a plan view, on a larger scale, of an LED array present in the exterior luminaire shown in FIG. 4.

As shown in FIG. 5, the LEDs 2 are set at different directing angles to the reflector 22 and facets 24 and the beams of light emitted from the LEDs 2 are reflected over a range of angles to create a wider beam of light for emission from the luminaire. A typical array of LEDs 2 is shown in FIG. 6.

The reflected light from the luminaire travels through the diffusing material 16 which scatters the light into lower intensity beams but does not change the direction of the light. By passing the light through the diffusing material 16 prior to illuminating the surroundings the glare of the light is reduced.

Figure 7:
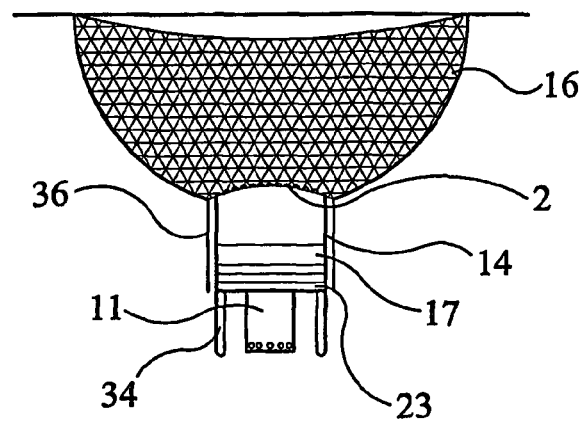
FIG. 7 is a view, on a larger scale, of the heat regulating means and LED array present in the lower portion of the exterior luminaire shown in FIG. 4.

FIG. 7 shows the chassis component 34 and the arrangement of the thermally insulated and sealed LED compartment 14 and the heat regulating means 17, 23, 36.

Heat in the LED chamber 14 is removed by the heat regulating means which comprises a heat pump 17, external heat sink 36 and the heat conversion module 23. The heat pump 17 removes the heat and a proportion of the heat is converted into electrical energy by the heat conversion module 23. The heat conversion module 23 comprises a doped semi-conductor which produces electrical potential in response to the passage of heat through the semi-conductor.

The heat conversion module 23 reclaims some of the heat and converts it into electrical energy which is fed back to the electronic circuitry to be stored and re-used. The unconverted heat is dissipated through the finned external heat sink 36.

As hereinbefore described, the converted electrical energy is stored in the batteries 19.

A light sensor (not shown), generates an electrical current which is transmitted to the electronic circuitry 11 to determine whether there is any reduction in light output or change in colour temperature over time and to compensate the power to the LEDs accordingly to maintain a stable light output over the life of the luminaire.

As with the first embodiment, the electronic circuitry 11 is responsible for the correct operation of the LEDs when the photo-sensitive cell 10 detects dusk.

The circuitry 11 also monitors and regulates the re-use of electrical energy recovered from the heat conversion module 23 and controls the charging rate of the remote batteries 19 with energy from the solar panel 7 during daylight hours. The electronic circuitry, in conjunction with the photo-sensitive cell 10, also protects the batteries 19 against overcharging during periods of excessive light, for example during the summer months, and from being excessively discharged during prolonged poor light conditions, for example in the winter. Further, the electronic circuitry maintains a stable temperature in the LED chamber 14.

As hereinbefore described in relation to the first embodiment, the electronic circuitry monitors and stores data on the operational status and characteristics of operating systems used in the luminaire, and transmits the data to a master or central computer (not shown) for analysis and display to an operator.

For both embodiments described hereinabove it should be appreciated that the solar panel 17 may be of a flat form or be shaped. The shaped solar panel can selected from a variety of shapes, for example a pyramid, a diamond, a polyhedron and a hemi-sphere, or can be in a shaped form wherein the upper surface is substantially parallel with the base of the solar panel. It should also be appreciated that the reflector 22 may have different surface finishes, rather than faceted members, which reflect incoming light at different angles towards the diffusing material.

An external luminaire according to the present invention can provide nominally 100,000 hours of low energy illumination with reduced glare.

The invention claimed is:

1. An exterior luminaire comprising within an outer body (12) an array of light emitting diodes (2), apparatus (7) for collecting and converting radiation into electrical energy so as to provide at least a part of the power required by the light emitting diodes (2), at least one light reflecting member (22) for reflecting light emitted by the light emitting diodes (2) out of the outer body (12), and a light diffusing member (16) in the path of the reflected light, the array of light emitting diodes being contained within a temperature controlled chamber to maintain the temperature around the array of light emitting diodes (2) within a predetermined range, the temperature controlled chamber being provided with regulating means comprising a heat pump for removing heat from the chamber, a heat sink (30) for dissipating heat and a heat-to-electrical energy conversion device (23).

2. An exterior luminaire as claimed in claim 1, wherein the converted electrical energy is stored in at least one chargeable battery (19).

3. An exterior luminaire as claimed in claim 2, wherein electronic circuitry (11) is provided for controlling the charging rate of the at least one battery (19).

4. An exterior luminaire as claimed in claim 2, wherein the at least one battery (19) is remote from the outer body (12).

5. An exterior luminaire as claimed in claim 1, wherein the light collecting apparatus comprises at least one solar panel (7).

6. An exterior luminaire as claimed in claim 5, wherein the at least one solar panel (7) is shaped.

7. An exterior luminaire as claimed in claim 6, wherein the shape of the at least one solar panel (7) is selected from a pyramid, a diamond, a polyhedron and a hemi-sphere.

8. An exterior luminaire as claimed in claim 5, wherein the at least one solar panel (7) is shaped such that an upper surface of the at least one solar panel is substantially parallel with a lower surface thereof.

9. An exterior luminaire as claimed in claim 5, wherein the at least one solar panel (7) is positioned in an upper region of the outer body (12).

10. An exterior luminaire as claimed in claim 1, wherein the at least one reflecting member (22) has a surface comprising a number of facets (24) to reflect the light along different angles.

11. An exterior luminaire as claimed in claim 1, wherein the at least one reflecting member (22) has a surface comprising a number of finishes to reflect the light along different angles.

12. An exterior luminaire as claimed in claim 1, wherein the temperature controlled chamber (14) is thermally sealed.

13. An exterior luminaire as claimed in claim 1, wherein the array of light emitting diodes (2) comprises diodes arranged at different angles relative to the at least one reflecting member (22).

14. An exterior luminaire as claimed in claim 1, wherein the light emitted by the array of light emitting diodes (2) is transmitted directly to the at least one reflecting member (22).

15. An exterior luminaire as claimed in claim 1, wherein the light emitted by the array of light emitting diodes (2) is transmitted by fibre optic means (15) to a means of distribution (21) before being directed at the at least one reflecting member (22).

16. An exterior luminaire as claimed in claim 1, wherein the light emitting diodes (2) are selected to produce a plurality of chromatic wavelengths.

17. An exterior luminaire as claimed in claim 16, wherein the chromatic wavelengths are mixed to generate different colours and/or colour temperatures.

18. An exterior luminaire as claimed in claim 16, wherein electronic circuitry (11) is provided for controlling the chromatic wavelength of light emitted from the luminaire.

19. An exterior luminaire as claimed in claim 1, wherein the heat regulating means converts heat energy into electrical energy for storage and subsequent use.

20. An exterior luminaire as claimed in claim 19, wherein the electrical energy is stored in at least one battery (19).

21. An exterior luminaire as claimed in claim 20, wherein the at least one battery (19) is remote from the outer body.

22. An exterior luminaire as claimed in claim 1, wherein the outer body (12) also houses at least one photo-sensitive cell (10).

23. An exterior luminaire as claimed in claim 22, wherein the photo-sensitive cell (10) provides information to electronic controlling circuitry (11).

24. An exterior luminaire as claimed in claim 23, wherein the information is used by the electronic controlling circuitry (11) for the activating and deactivating of the light emitting diodes (2) during the cycle of day and night.

25. An exterior luminaire as claimed in claim 1, wherein the outer body (12) also houses at least one light sensor (26).

26. An exterior luminaire as claimed in claim 25, wherein the light sensor (26) provides feedback information to electronic controlling circuitry (11).

27. An exterior luminaire as claimed in claim 26, wherein the feedback information is used by the electronic controlling circuitry (11) to adjust power supplied to the light emitting diodes (2) to achieve an electrical characteristic produced by the light sensor that matches pre-set characteristics known to give required lighting effects.

28. An exterior luminaire as claimed in claim 1, wherein the light diffusing material (16) comprises an internally patterned polycarbonate material.

29. An exterior luminaire as claimed in claim 1, wherein electronic circuitry (11) is provided to transmit data relating to the operational status of the exterior luminaire to a computer for analysis and display.

30. An exterior luminaire as claimed in claim 23, wherein the information is used by the electronic controlling circuitry to regulate the charging and discharging rates of the at least one battery.

* * * * *